US005422886A

United States Patent [19]

Naito et al.

[11] Patent Number: 5,422,886

[45] Date of Patent: Jun. 6, 1995

[54] SYSTEM WHICH ACHIEVES EFFICIENT UTILIZATION OF BUSES FOR SELECTIVELY INTERCONNECTING COMMUNICATION LINES

[75] Inventors: Katsumi Naito; Yo Fukase, both of Tokyo, Japan

[73] Assignee: NEC Corporation, Tokyo, Japan

[21] Appl. No.: 221,396

[22] Filed: Mar. 31, 1994

[30] Foreign Application Priority Data

Mar. 31, 1993 [JP] Japan .................................. 5-073298

[51] Int. Cl.[6] .............................................. H04L 12/42

[52] U.S. Cl. ................................ 370/85.12; 370/85.9; 370/85.13

[58] Field of Search ............... 370/85.15, 85.12, 85.14, 370/85.13, 85.11, 85.1, 85.9, 85.5, 67

[56] References Cited

U.S. PATENT DOCUMENTS 4,393,497 7/1983 Cantwell, Jr. .................... 370/85.15
4,445,213 4/1984 Baugh et al. ..................... 370/85.12
4,536,873 8/1985 Leete ................................ 370/85.15
4,601,029 7/1986 Hargrave et al. ..................... 370/67

*Primary Examiner*—Douglas W. Olms
*Assistant Examiner*—Huy D. Vu
*Attorney, Agent, or Firm*—Ostrolenk, Faber, Gerb & Soffen

[57] ABSTRACT

A system for selectively interconnecting a plurality of communication lines, each of which is adapted for transmitting communication signals, includes a plurality of port buses connected to the communication lines through a plurality of interface circuits and to a loop bus through a plurality of switching units. The loop bus forms a loop shape. The communication signals are supplied to the loop bus through one of the port buses and circulate as a loop bus signal along the loop bus. Each of switching units distributes the loop bus signals between the another one of the part buses and the loop bus. On the other one of the port buses, the loop bus signals are sent as the communication signals.

15 Claims, 6 Drawing Sheets

SYSTEM WHICH ACHIEVES EFFICIENT UTILIZATION OF BUSES FOR SELECTIVELY INTERCONNECTING COMMUNICATION LINES

BACKGROUND OF THE INVENTION

This invention relates to a system for selectively interconnecting a plurality of communication lines to provide communication therebetween and, in particular, to a system capable of dealing with both of a data signal and a speech signal.

Various systems have been proposed for selectively distributing digital signals among a plurality of communication lines. A typical system is disclosed in U.S. Pat. No. 4,601,029 issued to Franklin Hargrave et al. In this conventional system, each communication port, through which communication signals are transmitted and received, is assigned with transmitting time slots on a transmission bus and receiving time slots on a reception bus. Communication is carried out by the use of the transmitting and receiving time slots.

In order to carry out intercommunication or two-way communication through two communication ports, the above-mentioned conventional system requires two transmission time slots on the transmission bus and two receiving time slots on the reception bus in the manner known in the art. In this connection, these buses can not be fully efficiently used. For example, it is assumed that a single frame consists of twenty-four time slots in each of the transmission and the reception buses. In this event, only twelve pairs of the communication ports can simultaneously carry out intercommunication through each pair.

In addition, it is impossible for the conventional switching system to deal with a particular signal having a transmission speed which is lower than that of a speech signal.

SUMMARY OF THE INVENTION

It is therefore an object of this invention to provide a system which achieves efficient utilization of buses.

Other objects of this invention will become clear as the description proceeds.

According to an aspect of this invention, there is provided a system for selectively interconnecting a plurality of communication lines each of which is adapted for transmitting a communication signal. The system comprises a plurality of port buses and a plurality of interface circuits connected to the communication lines and the port buses, respectively. Each of the interface circuits carries out a transmission of the communication signal between each of the communication lines and each of the port buses. The system further comprises a loop bus forming a loop shape, exchanging means connected to the port buses and the loop bus for exchanging the communication signal between the port buses through the loop bus, and means connected to the exchanging means for controlling operation of the exchanging means.

According to another aspect of this invention, there is provided a system for selectively interconnecting a plurality of communication lines. The system comprises a plurality of bidirectional buses for propagation of communication signals supplied through the communication lines, a plurality of interface circuits connected to the bidirectional buses for carrying out transmission and reception of the communication signals to and from the bidirectional buses, a plurality of switching units connected in one-to-one correspondence to the bidirectional buses for exchanging the communication signals on the bidirectional buses, a unidirectional bus connecting the switching units to form a loop shape, a delay unit connected to the unidirectional bus for making the communication signal have a particular delay on the unidirectional bus, and means connected to the interface circuits for assigning to the interface circuits time slots available in communication by the use of the communication signals.

According to still another aspect of this invention, there is provided an apparatus for exchanging an input signal and an output signal by the use of a repetitive sequence of time slots. The apparatus comprises a unidirectional bus forming a loop shape and a plurality of bidirectional buses connected to the unidirectional bus. Each of the bidirectional buses is adapted for selectively propagating the input and the output signals in a particular time slot of the first-mentioned time slot sequence and has an input and an output mode which use each of the time slots as a transmitting time slot and as a receiving time slot, respectively. The apparatus further comprises a plurality of switching units each of which is connected between the unidirectional bus and each of the bidirectional buses, a plurality of interface circuits connected to the bidirectional buses, a delay unit connected to the unidirectional bus, and a timing-generating unit connected to the unidirectional bus and generating a succession of frame pulses and a succession of clock pulses to supply the frame pulse succession and the clock pulse succession to the switching units, the interface circuits, and the delay unit. Each of the interface circuits comprises interface-producing means for producing a state indication signal and a use indication signal in response to the input signal, interface-supplying means connected to the interface-producing means and to one of the bidirectional buses for supplying the state indication, the use indication, and the communication signals to the transmitting time slot on the one of the bidirectional buses, and receiving means connected to the one of the bidirectional buses for receiving the communication signal from the receiving time slot on the one of the bidirectional buses. Each of the switching units comprises judging means connected to the one of the bidirectional buses for judging whether or not the state indication signal is present in the particular time slot on the one of the bidirectional buses and first transmitting means connected to the unidirectional bus and the judging means for transmitting the communication signal from one of the interface circuits to a specific time slot on the unidirectional bus when the state indication signal is present in the particular time slot. The specific time slot corresponds to the particular time slot. Each of the switching units further comprises second transmitting means connected to the one of the bidirectional buses and the judging means for transmitting the communication signal from the one of the interface circuits to the particular time slot on the one of the bidirectional buses when the state indication signal is absent in the particular time slot.

According to yet another aspect of this invention, there is provided a system for selectively interconnecting a plurality of communication lines each of which is adapted for transmitting a communication signal. The system comprises signal circulating means for circulating a loop bus signal along a loop shape, signal supplying means connected to a first one of the communication lines and to the signal circulating means for supplying the communication signal as the loop bus signal from the first one, signal sending means connected to a second one of the communication lines and to the signal circulating means for sending the loop bus signal as the communication signal to the second one from the signal circulating means, and distributing means connected to the signal circulating and the signal sending means for distributing the loop bus signal between the signal circulating and the signal sending means.

According to a further aspect of this invention, there is provided a method for selectively interconnecting a plurality of communication lines each of which is adapted for transmitting a communication signal. The method comprises steps of circulating a loop bus signal along a loop shape, supplying the communication signal as the loop bus signal from a first one of the communication lines, sending the loop bus signal as the communication signal to a second one of the communication lines from the signal circulating means, and distributing the loop bus signal between the signal circulating and the signal sending means.

DESCRIPTION OF THE PREFERRED EMBODIMENT

Figure 1:
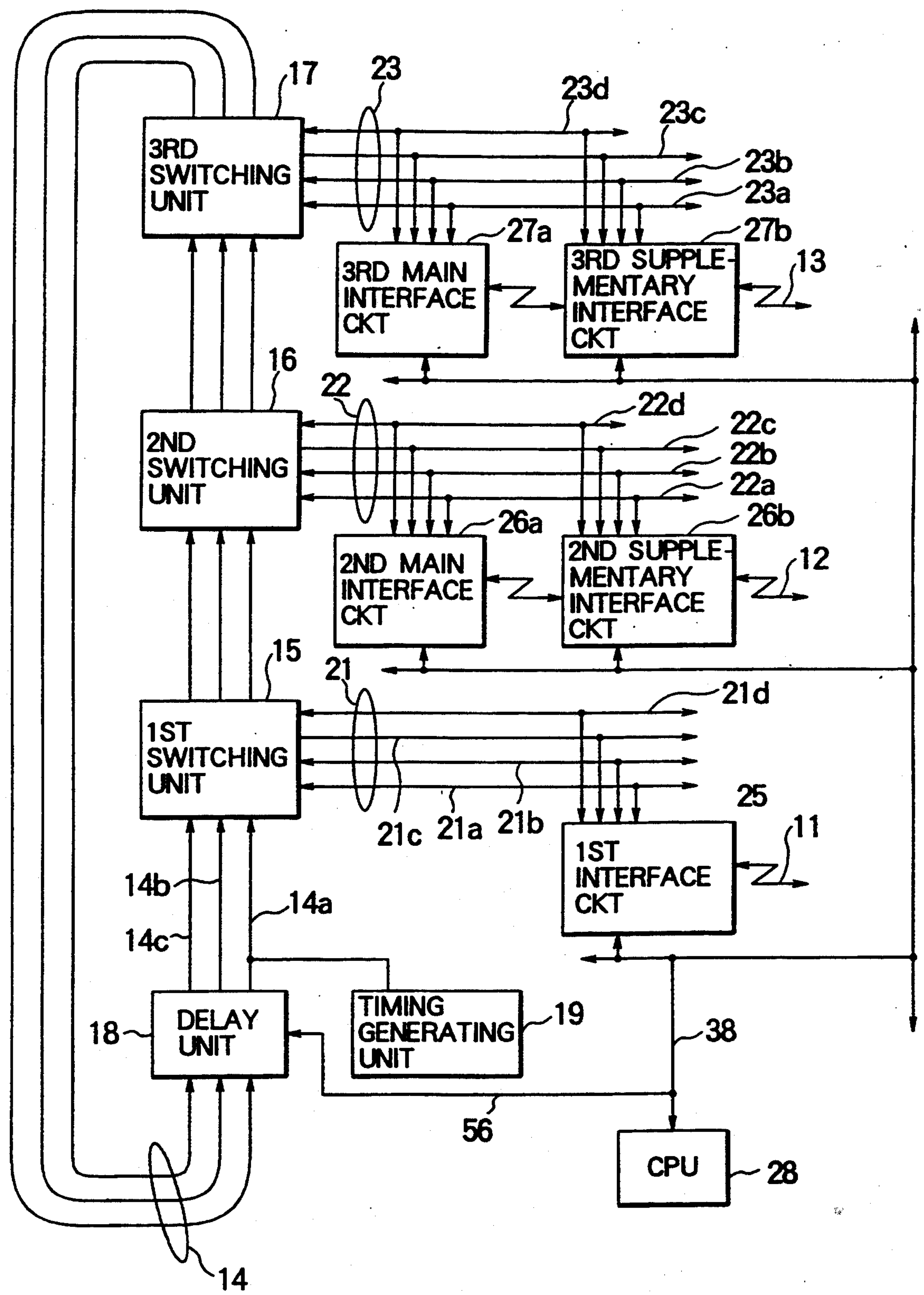
FIG. 1 is a block diagram of a system according to an embodiment of this invention.

Referring to FIG. 1, description will be made of a system according to an embodiment of this invention. The system is for selectively interconnecting first, second, and third communication lines 11, 12, and 13 each of which is adapted for transmitting an input and an output signal by the use of a repetitive sequence of time slots in the manner known in the art. A combination of the input and the output signals may be called a communication signal.

The system comprises a loop bus 14, first, second, and third switching units 15, 16, and 17, a delay unit 18, and a timing-generating unit 19. The loop bus 14 comprises loop timing, loop data, and loop use indication buses **14*a*, 14*b*, and 14*c* each of which forms a loop shape. In the loop bus 14, a loop bus signal is transmitted along the loop shape in a predetermined direction which is indicated by an arrow. Therefore, the loop bus 14** may be called a unidirectional bus.

Each of the first, the second, and the third switching units 15, 16, and 17 is connected to the loop timing, the loop data, and the loop use indication buses **14*a*, 14*b*, and 14*c* of the unidirectional bus 14 and has operation which will later be described in detail. A combination of the first, the second, and the third switching units 15, 16, and 17** is referred to as an exchanging arrangement.

The delay unit 18 is connected to the loop timing, the loop data, and the loop use indication buses **14*a*, 14*b*, and 14*c* of the unidirectional bus 14 and is for making the loop bus signal have a particular delay on the unidirectional bus 14. The timing-generating unit 19 is connected to the loop timing bus 14*a* and is adapted for generating a timing signal to supply the timing signal to the loop timing bus 14*a***. The timing signal comprises a succession of clock pulses and a succession of frame pulses of 8 kHz.

The system further comprises first, second, and third port buses 21, 22, and 23, first interface, second main interface, second supplementary interface, third main interface, and third supplementary interface circuits 25, **26*a*, 26*b*, 27*a*, and 27*b*, and a central processing unit 28. The first port bus 21 comprises first state indication, first data, first timing, and first use indication buses 21*a*, 21*b*, 21*c*, and 21*d* which are connected to the first switching unit 15 and the first interface circuit 25. The second port bus 22 comprises second state indication, second data, second timing, and second use indication buses 22*a*, 22*b*, 22*c*, and 22*d* which are connected to the second switching unit 16 and the second main interface and the second supplementary interface circuits 26*a* and 26*b*. The third port bus 23 comprises third state indication, third data, third timing, and third use indication buses 23*a*, 23*b*, 23*c*, and 23*d* which are connected to the third switching unit 17 and the third main interface and the third supplementary interface circuits 27*a* and 27*b*. In each of the first, the second, the third port buses 21, 22, and 23, a port bus signal is transmitted in both of a first direction and a second direction opposite to the first direction. Therefore, the first, the second, the third port buses 21, 22, and 23** may be called a first, a second, and a third bidirectional buses, respectively.

The first interface circuit 25 is connected to the first communication line 11. The second interface circuit 26 is connected to the second communication line 12. The third interface circuit 27 is connected to the third communication line 13. Each of the first, the second, and the third interface circuits 25, 26, and 27 performs an operation which will later be described in detail.

The central processing unit 28 is connected to the delay unit 18 and the first interface, the second main interface, the second supplementary interface, the third main interface, and the third supplementary interface circuits 25, **26*a*, 26*b*, 27*a*, and 27*b*** and is for producing a line control signal to control the system in the manner which will later become clear.

Figure 2:
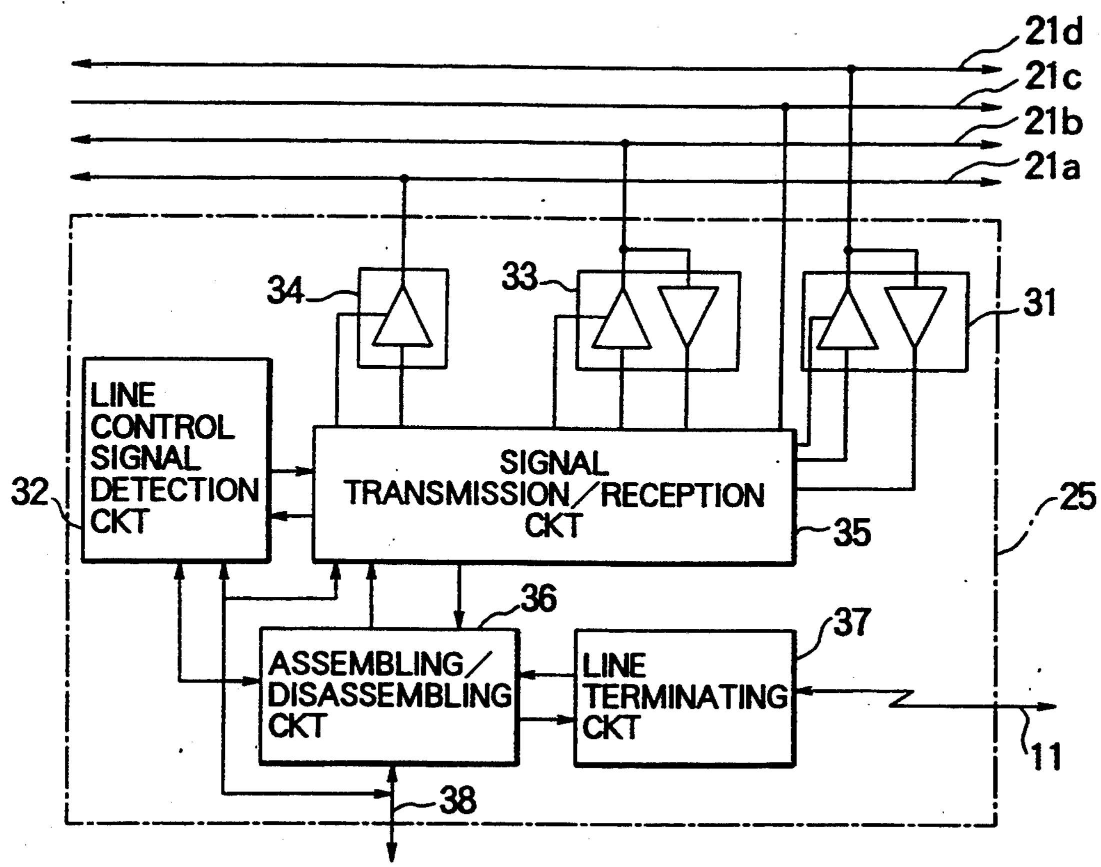
FIG. 2 is a block diagram of a first line interface circuit included in the system illustrated in FIG. 1.

Turning to FIG. 2, the description will be made as regards the first interface circuit 25 alone. The other interface circuits **26*a*, 26*b*, 27*a*, and 27*b* will not be described. This is because each of the other interface circuits 26*a*, 26*b*, 27*a*, and 27*b* has a structure similar to that of the first interface circuit 25**.

In the manner which will presently be described, the first interface circuit 25 comprises a use indication signal gate circuit 31, a line control signal detection circuit 32, a data signal gate circuit 33, a state indication signal gate circuit 34, a signal transmission/reception circuit 35, a signal assembling/disassembling circuit 36, and a line terminating circuit 37.

The line terminating circuit 37 terminates the communication signal sent through the first communication line 11 and carries out transmission and reception of the communication signal to and from the signal assembling/disassembling circuit 36. Received with the communication signal from the signal assembling/disassembling circuit 36, the line terminating circuit 37 transmits the communication signal to the first communication line 11. In this event, the line terminating circuit 37 will be referred to as an additional communication signal transmitting arrangement.

The signal assembling/disassembling circuit 36 disassembles or assembles the communication signal and the line control signal that is supplied through the line 38. The communication signal is transmitted and received between the signal assembling/disassembling and the signal transmission/reception circuits 36 and 35. The line control signal is transmitted and received between the signal assembling/disassembling circuit 36 and the line control data detection circuit 32.

In response to a transmission/reception request supplied from the signal transmission/reception circuit 35, the line control data detection circuit 32 carries out transmission and reception of the line control signal to and from the signal transmission/reception circuit 35.

During transmission, the signal transmission/reception circuit 35 produces a signal which will hereafter be called a control signal. In this event, the signal transmission/reception circuit 35 will be referred to as a control signal producing arrangement. The control signal is sent together with the communication signal to a predetermined time slot of a predetermined transmission frame in the manner known in the art. Specifically, the signal transmission/reception circuit 35 sends the control signal and the communication signal to the data signal gate circuit 33 collectively as a line data signal. The line data signal is supplied to the first data bus 21*b* from the data signal gate circuit 33. The data signal gate circuit 33 will be referred to as a communication signal transmitting arrangement.

At this time, the data transmission/reception circuit 35 produces a state indication signal indicating that the line data signal is transmitted. In this event, the data transmission/reception circuit 35 will be referred to as a state indication signal producing arrangement.

The state indication signal is supplied to the first state indication bus 21*a* through the state indication signal gate circuit 34. The state indication signal gate circuit 34 will be referred to as a state indication signal supplying arrangement.

Furthermore, the data transmission/reception circuit 35 produces a use indication signal indicating that the first data bus 21*b* is being used. The use indication signal is supplied to the first use indication bus 21*d* through the use indication signal gate circuit 31. Simultaneously, the transmission/reception circuit 35 supplies a gate control signal to each of the use indication signal gate circuit 31, the data signal gate circuit 33, and the state indication signal gate circuit 32 so as to selectively deliver the line data signal corresponding to a preassigned time slot on the first data bus 21*b*.

On the other hand, during reception, the transmission/reception circuit 35 receives the line data signal on a preselected time slot of a preselected reception frame. In this event, the signal transmission/reception circuit 35 will be referred to as a control signal receiving arrangement.

When the bus use indication signal at the time slot thus designated is active prior to transmission of the line data signal, the transmission/reception circuit 35 interrupts data transmission. During reception, the transmission/reception circuit 35 selectively receives the active data signal from the line data signal.

In the first interface circuit 25, the signal transmission/reception circuit 35 may be referred to as an interface-producing arrangement. A combination of the use indication signal gate, the data signal gate, and the state indication signal gate circuits 31, 33, and 34 may be referred to as an interface-supplying arrangement. The signal transmission/reception circuit 35 may be referred to as each of a use indication signal receiving arrangement and an interface-judging arrangement.

Figure 3:
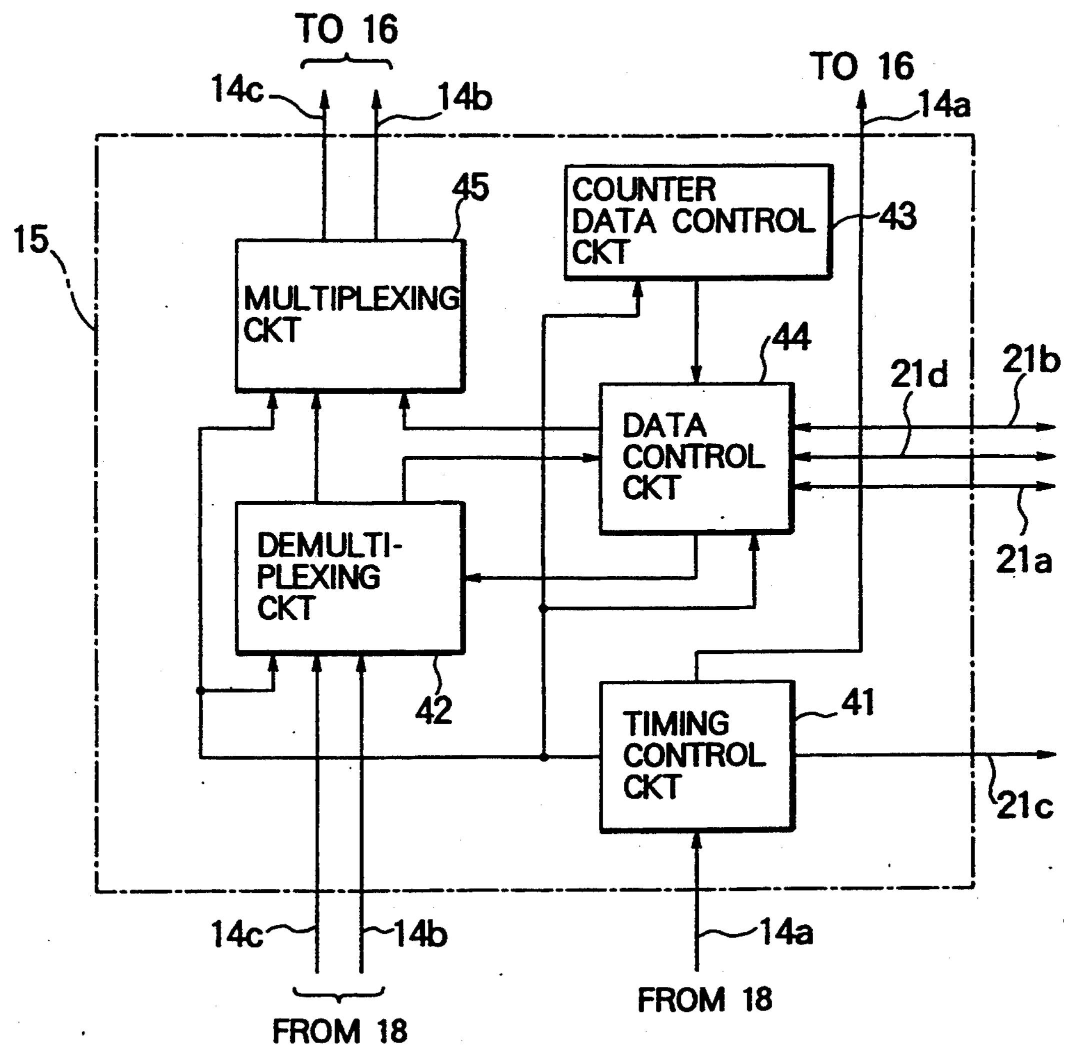
FIG. 3 is a circuit diagram of a first switching unit included in the system illustrated in FIG. 1.

Turning to FIG. 3 together with FIG. 1, the description will be directed to the first switching unit 15 alone. Each of the second and the third switching units 16 and 17 will not be described. This is because each of the second and the third switching units 16 and 17 has a structure similar to that of the first switching unit 15.

In the manner which will presently be described, the first switching unit 15 comprises timing control, demultiplexing, counter data control, data control, and multiplexing circuits 41, 42, 43, 44, and 45. Responsive to the timing signal supplied as a loop timing signal from the loop timing bus 14*a*, the timing control circuit 41 generates a clock signal and a frame signal. The clock signal is delivered through the first timing bus 21*c* to the first interface circuit 25. The frame signal is delivered through the loop timing bus 14*a* to the second switching unit 16. The clock and the frame signals are also supplied to the demultiplexing, the data control, the counter data control, the data control, and the multiplexing circuits 42, 43, 44, and 45.

In the manner which will become clear, it is assumed that the demultiplexing circuit 42 is supplied with the data and the use indication signals through the loop data and the loop use indication buses 14*b* and 14*c*, respectively. Responsive to the clock, the frame, the data, and the use indication signals, the demultiplexing circuit 42 carries out demultiplexing operation between the data and the use indication signals to produce a demultiplexed signal and a multiplexing signal. The demultiplexed signal is supplied to the data control circuit 44. The multiplexing signal is supplied to the multiplexing circuit 45. The counter data control circuit 43 produces a counter active signal in response to the clock and the frame signals to supply the counter active signal to the data control circuit 44. In addition, the data control circuit 44 is received with the state indication, the line data, and the use indication signals through the first state indication, the first data, and the first use indication buses 21*a*, 21*b*, and 21*d*. In this event, the data control circuit 44 will be referred to as a receiving arrangement.

In response to the clock, the frame, the demultiplexed, the counter active, the state indication, the line data, and the use indication signals, the data control circuit 44 produces an interruption indication signal, an active line indication signal, the line data signal, and the use indication signal in the manner which will presently be described.

The timing control circuit 41 determines whether or not the state indication signal is present on the first indication bus 21*a*. In this event, the timing control circuit 41 will be referred to as an exchange-judging arrangement.

When the state indication signal is present on the first state indication bus 21*a*, the data control circuit 44 takes the line data signal on the first data bus 21*b*. In this event, the data control circuit 44 will be referred to as a first transmitting arrangement. In addition, the data control circuit 44 takes the use indication signal on the first use indication bus 21*d* and delivers the line data signal and the use indication signal to the multiplexing circuit 45 collectively as an active line data signal.

Simultaneously, the data control circuit 44 delivers the interruption indication signal to the demultiplexing circuit 42. Responsive to the interruption indication signal, the demultiplexing circuit 42 interrupts the demultiplexing operation thereof.

On the other hand, when the state indication signal is absent on the first state indication signal bus 21*a*, the data control circuit 44 receives the demultiplexed signal from the demultiplexing circuit 42 and delivers the line data signal and the use indication signal to the first data bus 21*b* and the first use indication bus 21*d*, respectively. Furthermore, the data control circuit 44 delivers the counter active signal to the first data bus 21*b*.

The multiplexing circuit 45 is for multiplexing the multiplexing signal and the active line indication signal to produce a multiplexed signal and the use indication signal. The multiplexed signal is supplied as the data signal to the second switching unit 16 through the loop data bus 14*b*. The use indication signal is supplied to the second switching unit 16 through the use indication bus 14*c*. A combination of the data control circuit 44 and the multiplexing circuit 45 will be referred to as a second transmitting arrangement.

Figure 4:
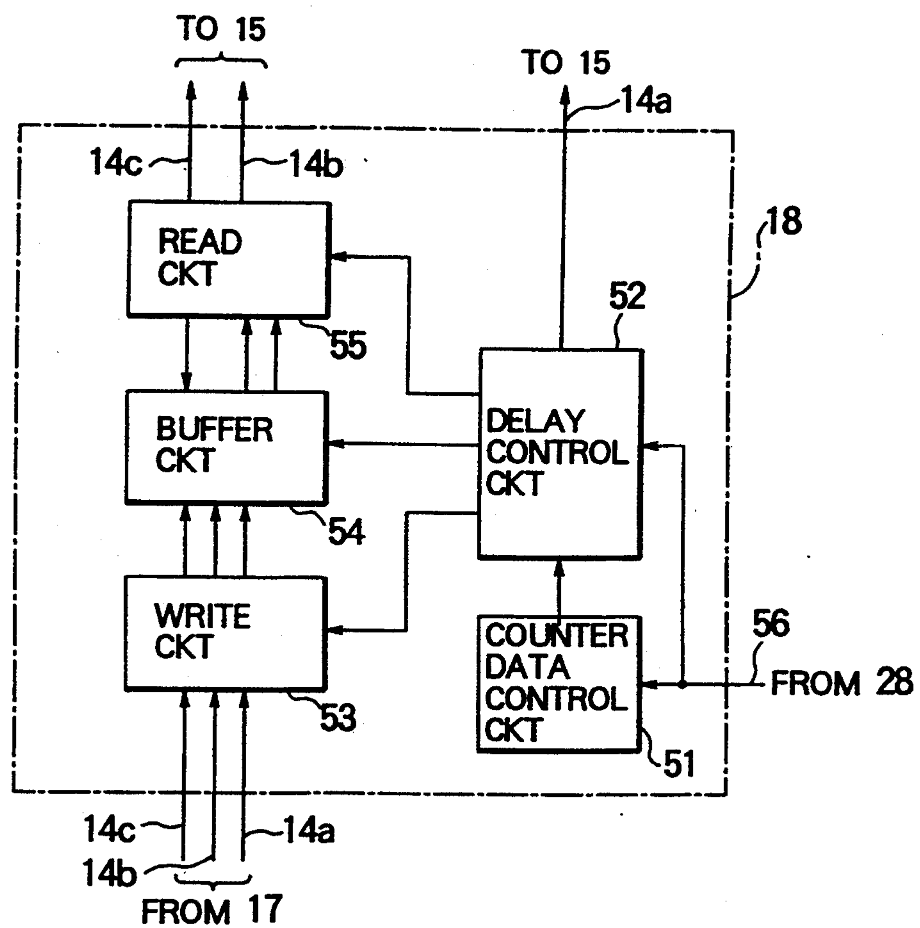
FIG. 4 is a block diagram of a delay unit included in the system illustrated in FIG. 1.

Turning to FIG. 4, the description will be directed to the delay unit 14. In the manner which will be described in the following, the delay unit 14 comprises a count data producing circuit 51, a delay control circuit 52, a write circuit 53, a buffer circuit 54, and a read circuit 55. The count data producing circuit 51 is supplied with a delay control signal from the central processing unit 28 through the line 56. In this event, the count data producing circuit 51 will be referred to as a count data sending arrangement.

In operation, the count data control circuit 51 counts up count data one by one as from an initial value or zero to an upper limit value in response to the delay control signal. When the count data reaches the upper limit value, the count data control circuit 51 resets the count data. The count data are sent as a count data signal to the delay control circuit 52. The above-mentioned operation is cyclically repeated.

Responsive to the delay control signal and the count data, the delay control circuit 52 controls operation of the write circuit 53, supplies the count data to the buffer circuit 54, and controls the timing of operation of the read circuit 55. Received with a write request from the delay control circuit 52, the write circuit 53 writes the loop data signal and the use indication signal into the buffer circuit 54 with reference to the clock signal and the frame signal. Received with a write inhibition request supplied from the delay control circuit 52, the write circuit 53 interrupts its writing operation. During interruption, the buffer circuit 54 is written with the count data that are supplied from the count data control circuit 51 through the delay control circuit 52.

The buffer circuit 54 comprises a FIFO memory and holds the data signal supplied from the write circuit 54 to make the data signal be read under control of the read circuit 55. Typically, the buffer circuit 54 holds the line data signal in an amount corresponding to one of signal frames which are defined in accordance with the frame signal. It is noted that this amount is variable under control of the delay control circuit 55. The buffer circuit 54 also holds the count data that is supplied from the delay control circuit 52. In response to the timing signal, the reads circuit 55 read the data signal and the use indication signal from the buffer circuit 54 to send the data signal and the use indication signal to the loop data bus 14b and the loop use indication bus 14c, respectively. Thus, the data and the use indication signals are delayed by one of the signal frames and sent to the second switching unit 16.

Figure 5:
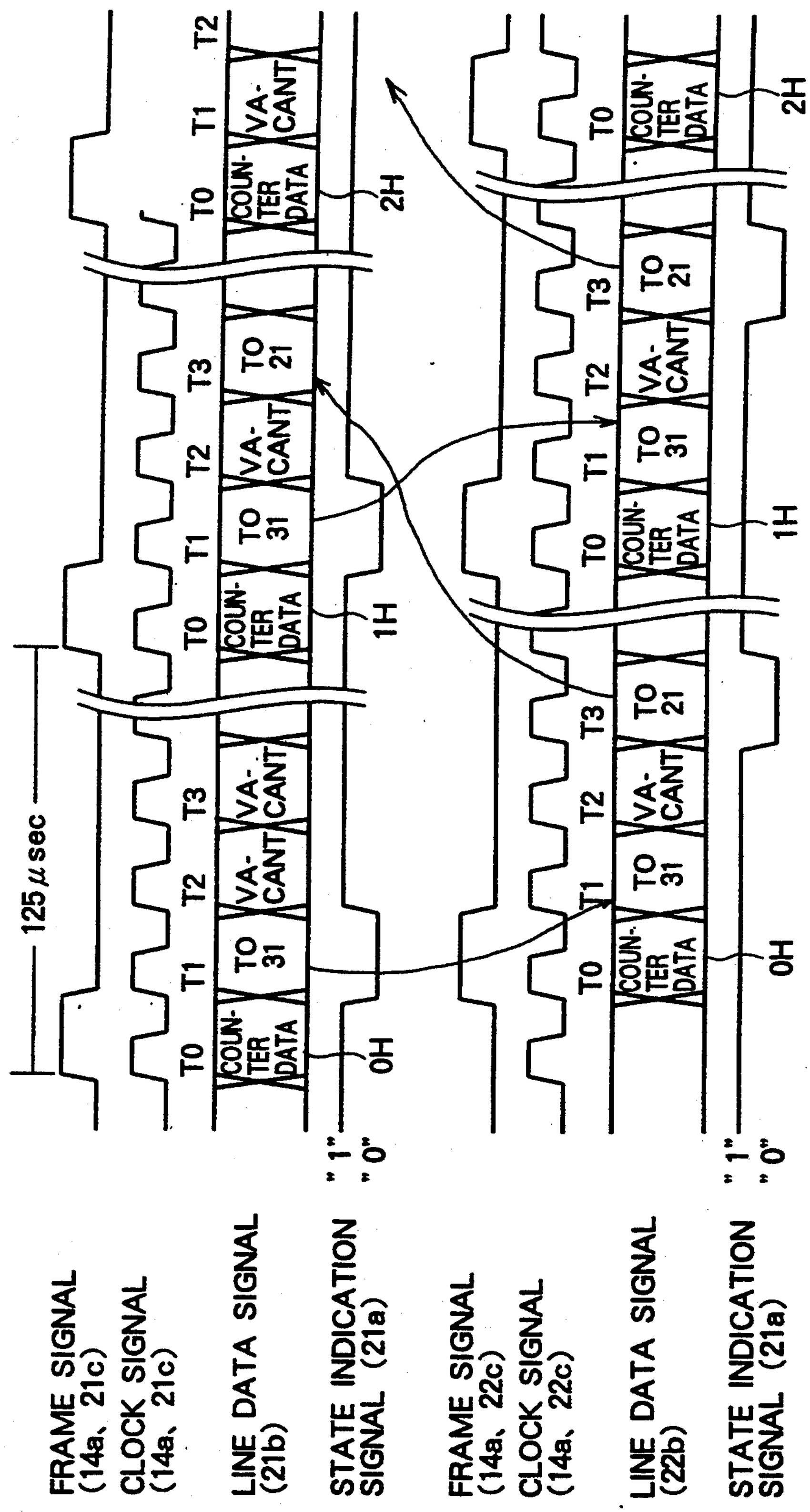
FIG. 5 is a time chart for describing an exchange operation between bidirectional buses included in the system illustrated in FIG. 1.

Next referring to FIG. 5 together with FIG. 1, the description will be directed to an example of basic operation of the system. The frame signal on each of the first and the second timing buses 21*c* and 22*c* is depicted along each of a first or top line and a fifth line. The clock signal on each of the first and the second timing buses 21*c* and 22*c* is depicted along each of a second line and a sixth line. A repetitive sequence of time slots on each of the first and the second data buses 21*b* and 22*b* is illustrated along each of a third line and a seventh line as zeroth, first, second, and third time slots T0, T1, T2, and T3. The state indication signal on each of the first and the second state indication buses 21*a* and 22*a* is depicted along each of a fourth line and an eighth line.

The central processing unit 28 assigns the first and the second interface circuits 25 and 26 with the zeroth through the third time slots T0 to T3 as follows. On each of the first and the second data buses 21*b* and 22*b*, the zeroth time slot T0 is assigned for the count data signal. On the first data bus 21*b*, the first time slot T1 is assigned as a transmission time slot. The third time slot T3 is assigned as a reception time slot.

On the second data bus 22*b*, the first time slot T1 is assigned as the reception time slot. The third time slot T3 is assigned as a transmission time slot.

Upon transmission of the line data signal, the first interface circuit 25 sends a logic "0" level to each of the first state indication bus 21*a* and the first use indication bus 21*d* at the first time slot T1. The operation is repeated before termination of the line data signal.

The description will be made of a case where the communication signal is transmitted from the first interface circuit 25 to the second main interface circuit 26*a*. The first switching unit 15 monitors the first state indication bus 21*a*. When the first state indication bus 21*a* has the logic "0" level, the first switching unit 15 sends the multiplexed and the use indication signals towards the second switching unit 16 collectively as the loop bus signal. Supplied with the loop bus signal, the second switching unit 16 sends the line data signal to the second data bus 22*b* and the second use indication bus 22*d* only when the second state indication bus 22*a* has a logic "1" level. The second main interface circuit 26*a* confirms the first time slot T1 on the second data bus 22*b* and receives the line data signal that is addressed to the second main interface circuit 31.

The description will be directed to another case where the communication signal is transmitted from the second main interface circuit 26*a* to the first interface circuit 25. In this case, the line data signal is delivered to the third time slot T3 on the second data bus 22*b*. In the manner similar to that described in conjunction with the first switching unit 15, the second switching unit 16 delivers the line data signal to the loop data bus 14*b* and the loop use indication bus 14*c*.

The line data signal is sent through the third switching unit 17 to the delay unit 18. The delay unit 18 gives the particular delay having a length corresponding to one of the signal frames. Thus, the line data signal is carried on the third time slot T3 of a following signal frame immediately following a frame position of the transmission frame delivered from the second main interface circuit 26*a*. The line data signal is circulated on the loop data bus 14*b*.

Supplied with the line data signal, the first switching unit 15 delivers the line data signal to the first data bus 21*b* and to the first use indication bus 21*d* only when the state indication bus 21*a* has the logic "1" level in a time instant corresponding to the third time slot T3. The first interface circuit 25 confirms the third time slot T3 and receives the line data signal that is addressed to the first interface circuit 25.

Figure 6:
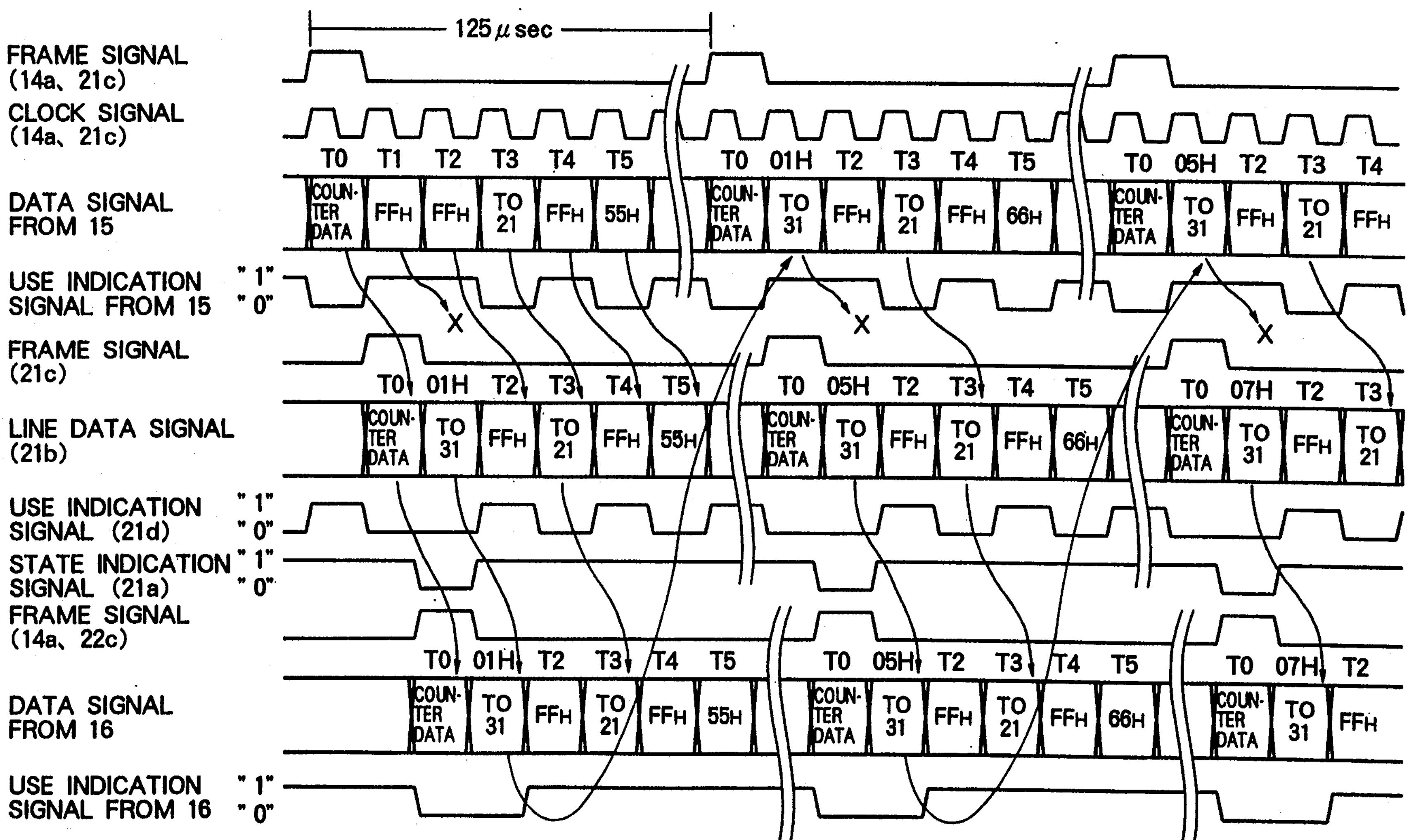
FIG. 6 is a time chart for describing operation of the first switching unit included in the system illustrated in FIG. 1.

Further referring to FIG. 6, the description will be directed to operation of the first switching unit 15. As described in the foregoing, the count data signal is sent from the delay unit 18 to a predetermined time slot. It is assumed here that the count data signal is present at a zeroth time slot T0. Each of the first interface circuit 25 and the second main interface circuit 26*a* is preliminarily allotted with transmission and reception frame positions and time slot positions which are indicated by the count data signal. Operation is carried out similar to the basic operation as described above. Thus, by deciding the frame position, it is possible to exchange a particular communication signal having a speed slower than 64 kbps in addition to the basic data signal on the order of, for example, 64 kbps.

In a case where the communication signal is of, for example, 32 kbps, the count data signal is assumed to have a repetition between a logic "0" level and a logic "1" level. The first interface circuit 25 is allotted with a zeroth frame and a first time slot T1 as a transmission frame and a transmission time slot and with a first frame and a third time slot T3 as a reception frame and a reception time slot. On the other hand, the second main interface circuit 26*a* is allotted with a zeroth frame and a third time slot T3 as a transmission frame and a transmission time slot and with a zeroth frame and a first time slot T1 as a reception frame and a reception time slot.

Thus, the transmission interval of each interface circuit is once per two frames so that the communication signal of 32 kbps is exchanged.

The use indication signal is controlled as follows. As described above, the use indication signal is sent to each interface circuit in the manner similar to the line data signal.

It is assumed here that a particular one of the interface circuits is about to transmit the line data signal. When the bus use indication signal has the logic "0" level at the assigned time slot, the interface circuit interrupts transmission of the line data signal until the use indication signal is turned to the logic "1" level. During reception, the interface circuit selectively receives an active component of the line data signal alone.

The description will be made as regards the control signal. As described above, each interface circuit is operable to deliver the line information signal and the control signal collectively as the line data signal.

For example, it is assumed that the control signal is a sound/silence information data signal indicating the state of the speech data. The speech data have a rate of 32 kbps. The delay has a length corresponding to two frames. The count data signal has the repetition between the logic "0" level and the logic "1" level. The first interface circuit 25 is assigned with the first time slot T1 of a zeroth frame for transmission of the control signal, the first time slot T1 of a first frame for transmission of the speech data signal, the third time slot T3 of a zeroth frame for reception of the control signal, and the third time slot T3 of a first frame for reception of the speech data signal.

The second main interface circuit 26*a* is assigned with the third time slot T3 of the zeroth frame for transmission of the control data signal, the third time slot T3 of the first frame for transmission of the speech data signal, the first time slot T1 of the zeroth frame for reception of the control data signal, and the first time slot T1 of the first frame for reception of the speech data signal.

Thus, the operation is carried out similar to the basic operation so that the control signal and the speech data signal are alternately transmitted and received.

With this structure, a single time slot is commonly used in transmission and reception. As a consequence, the efficiency in utilization of the bus is increased to twice as large as that of the conventional device using the transmission bus and the reception bus. In other words, the line data input/output control device of this invention has a reduced bus scale corresponding to one of the transmission and reception buses and still exhibits the capacity equivalent to that of the conventional device having the transmission and the reception buses.

In addition, it is possible to avoid data collision on the exchange bus by introducing control with the time slot use indication signal.

While the present invention has thus far been described in connection with only a single embodiment thereof, it will readily be possible for those skilled in the art to put this invention into practice in various other manners. For example, the system may comprise four or more port buses although three port buses are exemplified.

What is claimed is:

1. A system for selectively interconnecting a plurality of communication lines each of which is adapted for transmitting communication signals, said system comprising:

a plurality of port buses;

a plurality of interface circuits connected to said communication lines and said port buses, respectively, each of said interface circuits carrying out a transmission of said communication signals between each of said communication lines and each of said port buses;

a loop bus forming a loop shape;

exchanging means connected to said port buses and said loop bus for exchanging said communication signals between said port buses through said loop bus; and means connected to said exchanging means for controlling operation of said exchanging means, wherein each of said interface circuits comprises:

communication signal transmitting means connected to one of said communication lines and to one of said port buses for transmitting said communication signals from said one of the communication lines to said one of the port buses;

state indication signal producing means connected to said one of the communication lines for producing a state indication signal when said communication signals are sent from said one of the communication lines to said one of the port buses; and state indication signal supplying means connected to said state indication signal producing means and said one of the port buses for supplying said state indication signal to said one of the port buses.

2. A system as claimed in claim 1, wherein each of said port buses is adapted for transmitting said communication signals between each of said interface circuits and said exchanging means in each of a first direction and a second direction opposite to said first direction.

3. A system as claimed in claim 1, wherein said loop bus is for transmitting said communication signals along said loop shape in a predetermined direction.

4. A system as claimed in claim 1, further comprising delay means connected to said loop bus for making said communication signals have a particular delay on said loop bus.

5. A system as claimed in claim 4, further comprising delay control means connected to said delay means for controlling said delay means to adjust said particular delay.

6. A system as claimed in claim 1, further comprising timing-generating means connected to said loop bus for generating a timing signal to supply said timing signal to said port buses, said interface circuits, said loop bus, said exchanging means, and said operation control means.

7. A system as claimed in claim 1, wherein each of said interface circuits further comprises additional communication signal transmitting means connected to said one of the communication lines and to said one of the port buses for transmitting said communication signals from said one of the port buses to said one of the communication lines.

8. A system as claimed in claim 1, wherein said exchanging means comprises:

receiving means connected to said port buses and said loop bus for receiving said communication signals;

judging means connected to said port buses for judging whether or not said state indication signal is present on said one of the port buses;

first transmitting means connected to said loop bus, said receiving means, and said judging means for transmitting said communication signals from said receiving means to said loop bus when said state indication signal is present on said one of the port buses; and second transmitting means connected to said port buses, said receiving means, and said judging means for transmitting said communication signals from said receiving means to said one of the port buses when said state indication signal is absent on said one of the port buses.

9. A system for selectively interconnecting a plurality of communication lines, said system comprising:

a plurality of bidirectional buses for propagation of communication signals supplied through said communication lines;

a plurality of interface circuits connected to said bidirectional buses for carrying out transmission and reception of said communication signals to and from said bidirectional buses;

a plurality of switching units connected in one-to-one correspondence to said bidirectional buses for exchanging said communication signals on said bidirectional buses;

a unidirectional bus connecting said switching units to form a loop shape;

a delay unit connected to said unidirectional bus for making said communication signals have a particular delay on said unidirectional bus; and means connected to said interface circuits for assigning to said interface circuits time slots available in communication by the use of said communication signals, wherein each of said interface circuits comprises:

terminating means for terminating one of said communication signals to transmit said one of the communication signals to preselected transmission time slots on one of said bidirectional buses; and means for acquiring another one of said communication signals from preselected reception time slots on said one of the bidirectional boxes.

10. A system as claimed in claim 9, wherein said delay unit comprises delay control means for controlling said delay unit to adjust said particular delay.

11. An apparatus for exchanging communication signals including an input signal and an output signal by the use of a repetitive sequence of time slots, said apparatus comprising:

a unidirectional bus forming a loop shape;

a plurality of bidirectional buses connected to said unidirectional bus, each of said bidirectional buses being adapted for selectively propagating said input and said output signals in a particular time slot of the first-mentioned time slot sequence and having an input and an output mode which use each of said time slots as a transmitting time slot and as a receiving time slot, respectively;

a plurality of switching units each of which is connected between said unidirectional bus and each of said bidirectional buses;

a plurality of interface circuits connected to said bidirectional buses;

a delay unit connected to said unidirectional bus; and a timing-generating unit connected to said unidirectional bus and generating a succession of frame pulses and a succession of clock pulses to supply said frame pulse succession and said clock pulse succession to said switching units, said interface circuits, and said delay unit;

each of said interface circuits comprising:

interface-producing means for producing a state indication signal and a use indication signal in response to said input signal;

interface-supplying means connected to said interface-producing means and to one of said bidirectional buses for supplying said state indication, said use indication, and said communication signals to said transmitting time slot on said one of the bidirectional buses; and receiving means connected to said one of the bidirectional buses for receiving said communication signals from said receiving time slot on said one of the bidirectional buses;

each of said switching units comprising:

judging means connected to said one of the bidirectional buses for judging whether or not said state indication signal is present in said particular time slot on said one of the bidirectional buses;

first transmitting means connected to said unidirectional bus and said judging means for transmitting said communication signals from one of said interface circuits to a specific time slot on said unidirectional bus when said state indication signal is present in said particular time slot, said specific time slot corresponding to said particular time slot; and second transmitting means connected to said one of the bidirectional buses and said judging means for transmitting said communication signals from said one of the interface circuits to said particular time slot on said one of the bidirectional buses when said state indication signal is absent in said particular time slot.

12. An apparatus as claimed in claim 11, wherein said delay unit comprises count data producing means connected to said unidirectional bus for producing a count data signal synchronous with said frame pulses to send said count data signal to a preselected time slot on said unidirectional bus, each of said switching units comprising count data sending means connected to said count data producing means for sending said count data signal to said particular time slot on said one of the bidirectional buses, each of said interface circuits comprising means for controlling a transmission and a reception of said communication signals in accordance with said count data signal.

13. An apparatus as claimed in claim 12, wherein each of said interface circuits further comprises:

control signal producing means connected to said count data signal producing means for producing a control signal to supply said control signal-to a predetermined time slot which is determined in accordance with said count data signal;

control signal receiving means connected to said control signal producing means for receiving said control signal.

14. An apparatus as claimed in claim 11, further comprising delay control means connected to said delay unit for controlling operation of said delay unit.

15. An apparatus as claimed in claim 11, wherein each of said interface circuits further comprises:

use indication signal receiving means connected to said interface-producing means for receiving said use indication signal;

interface-judging means connected to said use indication signal receiving means for judging whether or not said use indication signal is representative of use of said particular time slot as said transmitting time slot; and means connected to said interface-judging means for controlling transmission of said communication signals from each of said port buses when said use indication signal is representative of use of said particular time slots.

* * * * *